United States Patent [19]

Fox et al.

[11] 4,259,594
[45] Mar. 31, 1981

[54] ELECTRICAL POWER SUPPLY APPARATUS

[75] Inventors: Jeffrey R. Fox, Concord; Arthur Margolies, Ashland; Rob Moolenbeek, Dover, all of Mass.

[73] Assignee: GTE Laboratories Incorporated, Waltham, Mass.

[21] Appl. No.: 75,783

[22] Filed: Sep. 17, 1979

[51] Int. Cl.³ .............................................. H01H 43/00
[52] U.S. Cl. .................................... 307/141; 364/707; 365/227
[58] Field of Search ...................... 307/142, 140–141.8; 365/226, 227, 228, 229; 364/707

[56] References Cited

U.S. PATENT DOCUMENTS 4,158,230  6/1979  Washizuka et al. .............. 364/707 X

FOREIGN PATENT DOCUMENTS 52-21737  2/1977  Japan ........................................ 364/707

Primary Examiner—L. T. Hix
Assistant Examiner—James L. Dwyer
Attorney, Agent, or Firm—David M. Keay

[57] ABSTRACT

Electrical power supply for use with apparatus which transmits a predetermined message. When an input signal is received, a source of electrical energy is connected to a power output terminal by turning a switching transistor on. A latching circuit holds the transistor on after termination of the input signal. Elements of the apparatus which are connected to the power output terminal to obtain operating power transmit the predetermined message when the electrical energy is supplied to the terminal. When the transmission is complete, the apparatus produces a termination signal to the latching circuit causing it to turn the switching transistor off and thus disconnect the source of electrical energy from the power output terminal. A delay arrangement prevents the latching circuit from responding to a termination signal for a predetermined period of time after the input signal has terminated, thus preventing inadvertent disconnecting of the source of electrical energy from the power output terminal before the apparatus has had an opportunity to attain full operation.

7 Claims, 5 Drawing Figures

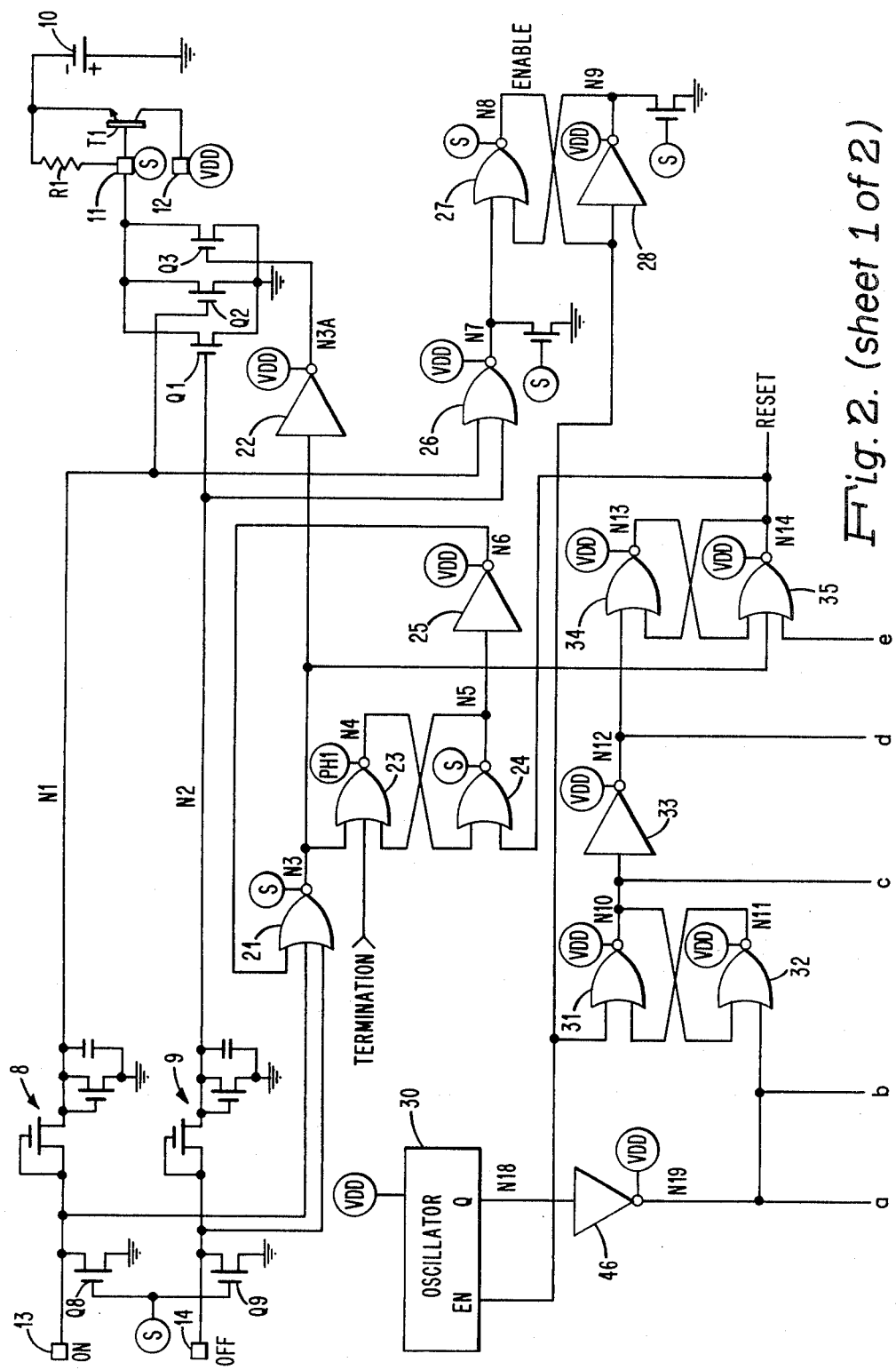
Fig. 2. (sheet 1 of 2)

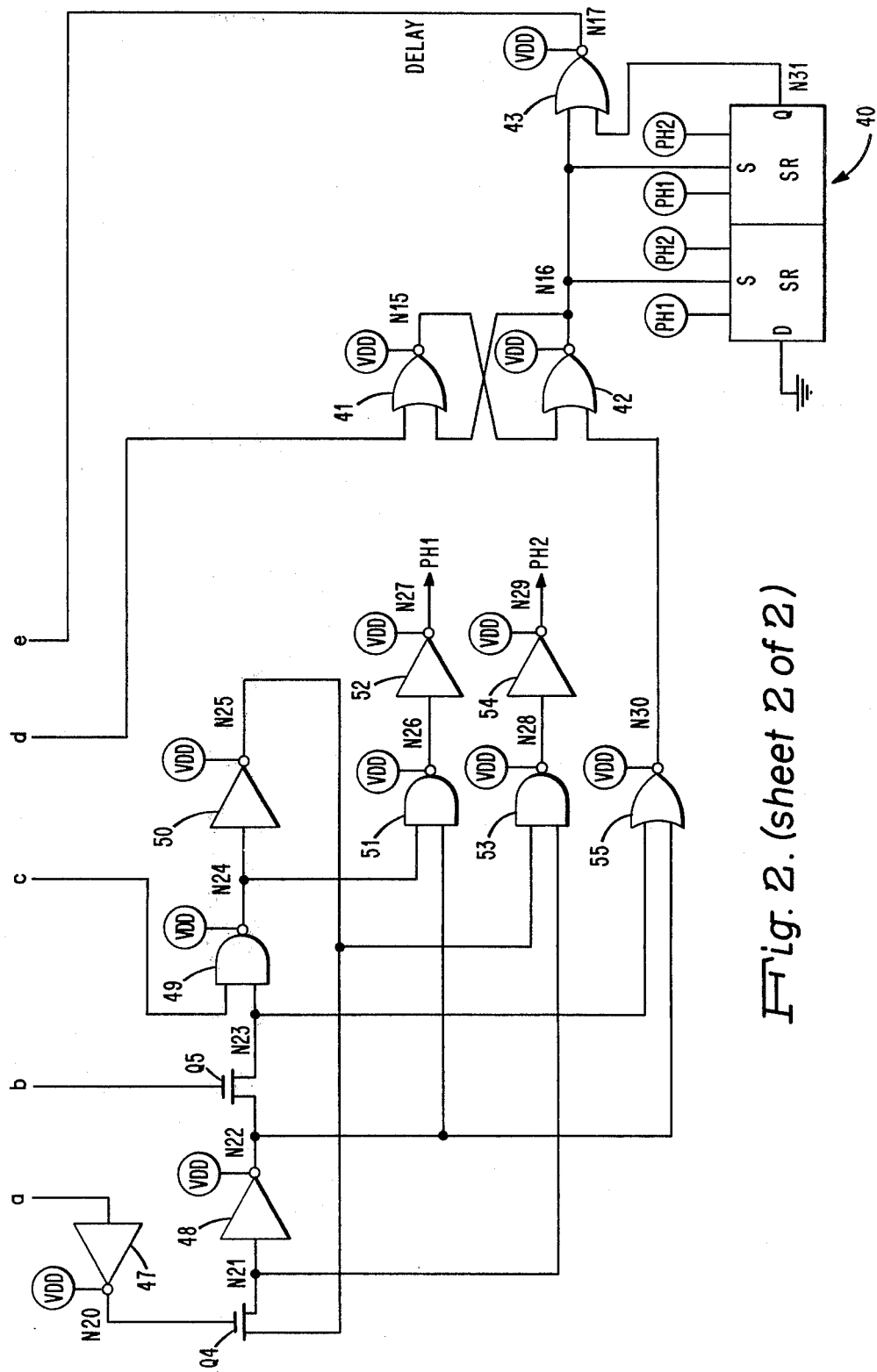
Fig. 2. (sheet 2 of 2)

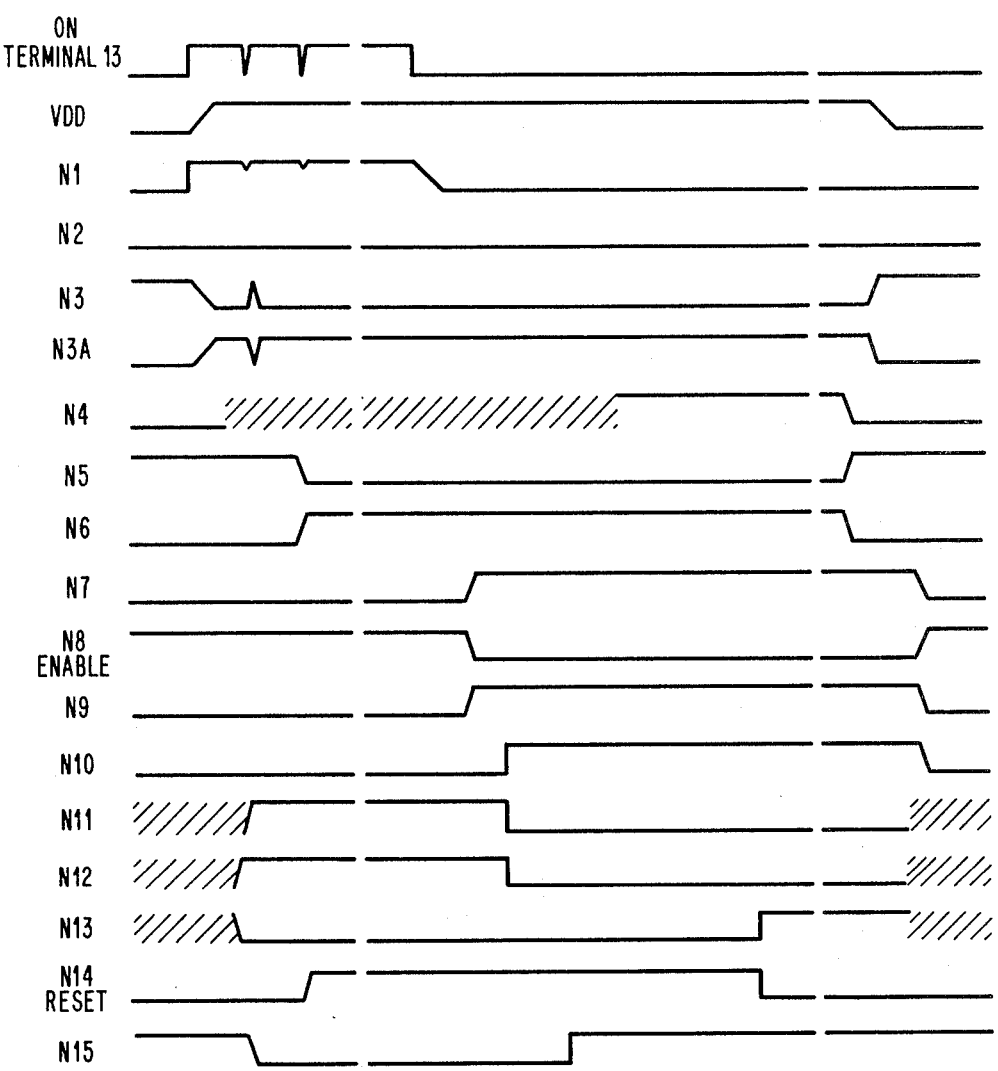
Fig. 3. (sheet 1 of 2)

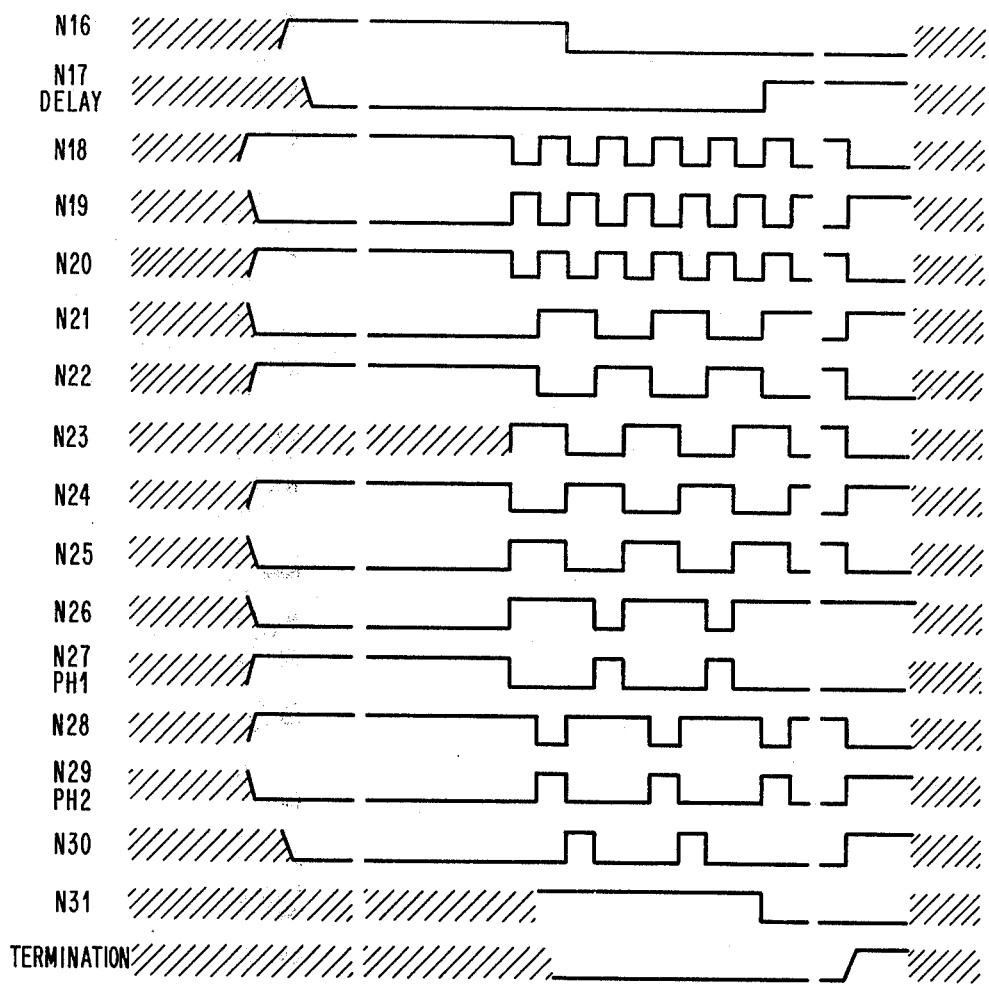
Fig. 3. (sheet 2 of 2)

ELECTRICAL POWER SUPPLY APPARATUS

BACKGROUND OF THE INVENTION

This invention relates to electrical power supplies. More particularly, it is concerned with electrical power supply apparatus which has low power consumption during standby operation and which provides electrical power for operating electrical apparatus only when required.

Many types of electrical apparatus operate infrequently or intermittently but must be ready on a standby basis for immediate operation when necessary. It is desirable that in the standby mode the apparatus consume very little power, particularly if it is battery powered. In many situations a simple manually-operated on-off switch can be used. However, in certain circumstances the apparatus may be in a remote location or must be turned on and/or off automatically in response to particular occurrences. Under conditions such as these the power supply must respond to an electrical signal to cause it to switch from the standby mode and provide operating potential for the apparatus.

SUMMARY OF THE INVENTION

Electrical power supply apparatus in accordance with the present invention consumes negligible power when in the standby mode. The apparatus is turned on to provide operating power to electrical circuitry in response to an electrical signal and is turned off and restored to the standby mode by an electrical signal upon completion of an operating cycle. The electrical power supply apparatus of the invention comprises a source of electrical potential and a power output terminal. A switch means is connected between the source of electrical potential and the power output terminal and when an activating signal is applied to the switch means it connects the source of electrical potential to the power output terminal. An input means is coupled to the switch means in response to an input signal. A latching means is coupled to the input means and to the switch means. In response to the input signal the latching means produces an activating signal to the switch means and maintains the activating signal subsequent to the termination of the input signal. The latching means terminates the activating signal to the switch means in response to receiving a termination signal. A delay means coupled to the latching means prevents a termination signal from terminating the activating signal for a predetermined period of time.

Thus, the electrical power supply apparatus responds to an input signal to connect a source of electrical power to a power output terminal. The power output terminal supplies the operating power to the electrical circuitry to be operated. The latching means causes the connection to be maintained after the input signal terminates. The latching means responds to a termination signal, which is derived from the electrical circuitry, to cause the source of electrical potential to be disconnected from the power output terminal returning the apparatus to standby. In order to prevent inadvertent disconnecting of the source of electrical potential from the power output terminal before the electrical circuitry is in full operation, the delay means prevents the terminal signal from affecting the latching means for a predetermined period of time.

BRIEF DESCRIPTION OF THE DRAWINGS

In the drawings:

FIG. 2 is a detailed logic diagram of electrical power supply apparatus in accordance with the present invention;

FIG. 3 are timing diagrams of logic levels at various nodes throughout the apparatus of FIG. 2 during an operating cycle;

For a better understanding of the present invention, together with other and further objects, advantages, and capabilities thereof, reference is made to the following disclosure and appended claims in connection with the above-described drawings.

DETAILED DESCRIPTION OF THE INVENTION

Figure 1:
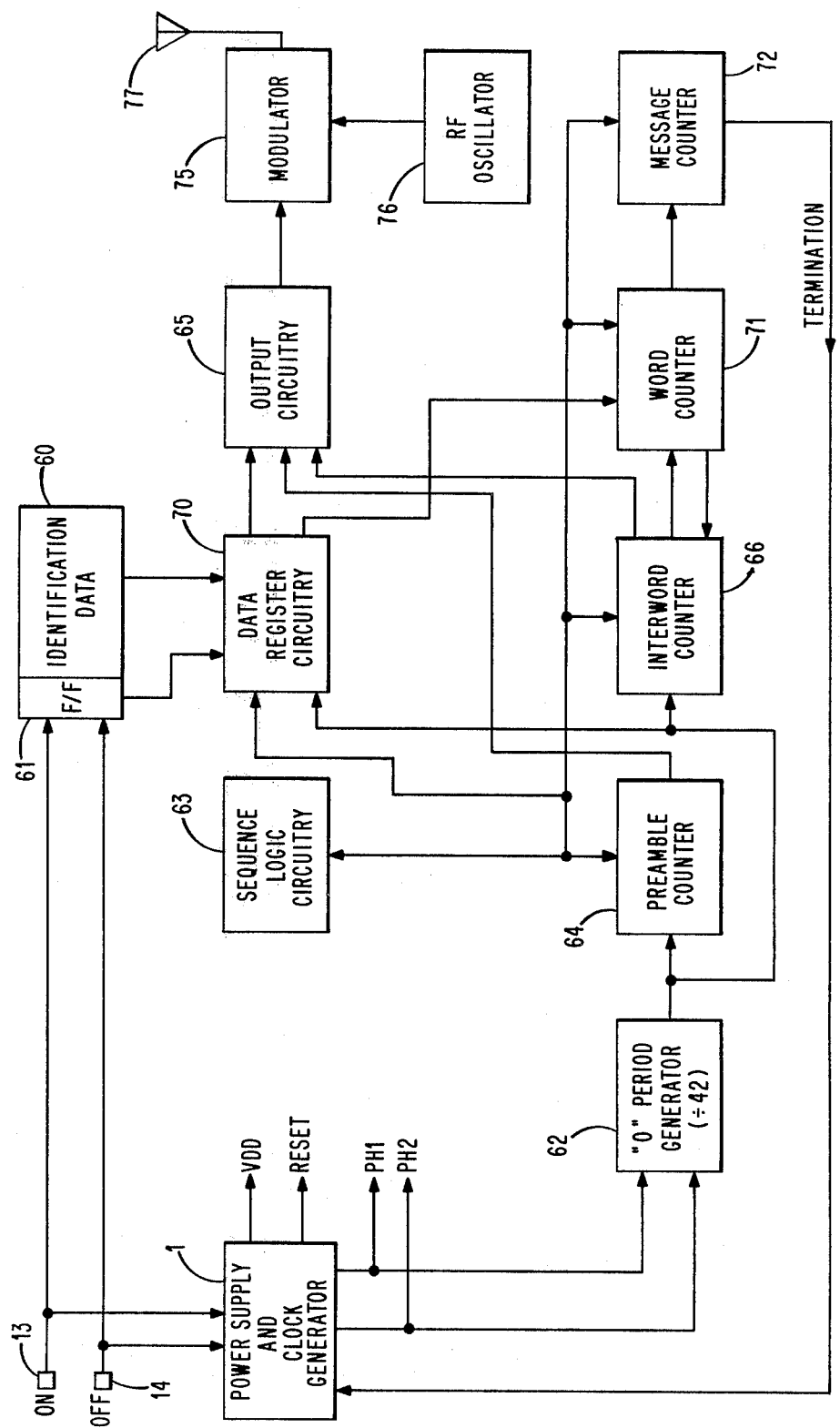
FIG. 1 is a block diagram of an encoder and transmitter incorporating electrical power supply apparatus in accordance with the present invention.

FIG. 1 is a block diagram illustrating an encoder and transmitter of the type employed in conjunction with sensing apparatus for monitoring the operation of electrical appliances as described and claimed in application Ser. No. 075,782 filed concurrently herewith by Richard L. Naugle entitled "Sensing Apparatus," and with sensing apparatus for monitoring the passage of objects through a doorway as described and claimed in application Ser. No. 075,769 filed concurrently herewith by William L. Geller and Richard L. Naugle entitled "Exit-Entry Sensing Apparatus." The encoder and transmitter of FIG. 1 sends predetermined encoded messages by RF transmission in response to momentary electrical signals at either of its input terminals 13 and 14. The encoder and transmitter is in a standby mode until an input signal is received at one of the input terminals 13 and 14. In response to an input signal the power supply section 1 of the encoder and transmitter provides operating potential and clock pulses to the other elements of the encoder and transmitter. The encoder and transmitter sends one of the two predetermined messages, depending upon which input terminal receives the input signal, and transmits the message as a continuous wave RF signal. Upon completion of the transmission, the encoder and transmitter returns automatically to the standby mode.

The power supply section 1 is illustrated in detail in the logic diagram of FIG. 2. The power source for the apparatus is a DC source which may be a battery 10, in the specific embodiment under discussion, a 9-volt battery. In the present discussion the positive terminal of the battery is considered ground, and the negative terminal is connected by way of an NPN bipolar switching transistor T1 to a power output terminal 12 labeled VDD. The emitter of the switching transistor T1 is connected to the negative terminal of the battery 10 and the collector is connected to the VDD terminal 12. The base of the transistor T1 is connected to a standby terminal 11 labeled S. The emitter of transistor T1 is connected to the S terminal 11 through a resistance R1. During standby while the transistor T1 is not conducting the potential at the S terminal 11 is −9 volts and the potential at the VDD terminal is approximately ground.

When transistor T1 is biased to conduction, as will be explained hereinbelow, the voltage at the VDD terminal 12 is within a $V_{CE}$ saturation voltage drop of the voltage at the negative terminal of the battery 10. Operating potential for most of the elements of the power supply is provided by their being connected to the VDD terminal 12, as indicated by the label VDD applied to these elements. Thus, these elements do not draw power until the negative terminal of the battery 10 is connected to the VDD terminal 12. Certain of the elements, having the label S applied thereto, are connected to the S terminal 11 and thus receive operating potential during standby. One element, NOR gate 23, does not receive operating potential until the first clock pulse PH1.

Throughout the present discussion of the power supply section, since the positive terminal of the battery 10 is considered ground and the operating potential is negative with respect to ground, negative logic is employed. That is, logic 0 is approximately ground and logic 1 is a negative voltage with respect to ground. The diagrams of FIG. 3 are timing diagrams in which the higher levels represent logic 1 and the lower levels represent logic 0, which is the reverse of the actual voltage levels. P-channel MOS integrated circuits are utilized through the power supply section, except for the bipolar switching transistor T1.

The input terminals 13 and 14 may be the output terminals of sensing apparatus as described and claimed in the two aforementioned applications. For example, terminal 13 may be the terminal on which a negative-going pulse, logic 1, occurs to indicate an appliance being turned on and terminal 14 the terminal on which a negative-going pulse, logic 1, occurs to indicate the appliance being turned off. The input terminals 13 and 14 are each connected to an MOS transistor Q8 and Q9, respectively to provide appropriate returns to ground for negative-going input pulses. Input signals are passed through debouncing arrangements of MOS transistors and capacitors 8 and 9 to smooth out the signals. The input signals at terminals 13 and 14 are then coupled to the gates of MOS transistors Q2 and Q1, respectively. These MOS transistors are connected between the S terminal 11 and ground. A negative-going pulse, logic 1, on either input terminal 13 or 14 causes the associated MOS transistor Q2 or Q1, respectively, to conduct providing a low impedance path between the S terminal 11 and ground. Base current drive is thus provided for the switching transistor T1 biasing it to saturation and, in effect, connecting the VDD terminal 12 to the negative terminal of the battery 10.

The input terminals 13 and 14 are also connected by way of a NOR gate 21 to a latching circuit of NOR gates 34 and 35 and to a latching circuit of NOR gates 23 and 24. The latching circuit 34-35 also has inputs from other elements of the power supply section. A logic 0 DELAY signal (N17 of FIG. 3) from NOR gate 43 and a logic 1 signal (N12) from inverter 33 when it is turned on are applied to the latching circuit 34-35, together with the logic 0 signal (N3) from the NOR gate 21. The latching circuit 34-35 thus operates in a state producing a logic 1 RESET signal (N14) which is applied to various elements of the encoding and transmitting sections of the apparatus to set their initial conditions for an operating cycle.

The RESET signal is also applied to the latching circuit 23-24 causing it to change operating states. The output (N5) of latching circuit 23-24 is applied through inverter 25, NOR gate 21, and inverter 22 as the input (N3A) to the gate of another MOS transistor Q3 turning it on and providing a low impedance path between the S terminal 11 and ground. Thus, latching circuit 23-24 sustains a low impedance path to ground for the base of the switching transistor T1 maintaining the switching transistor T1 in its conducting condition despite subsequent termination of the input signal on terminal 13 or 14. The latching circuit 23-24 is unlatched resorting the switching transistor T1 to the nonconducting condition by a TERMINATION signal applied to the NOR gate 23 as will be explained hereinbelow. The TERMINATION signal in the particular apparatus under discussion is received from the encoding and transmitting sections and occurs automatically when a transmission cycle has been completed. Latching circuit 23-24 is inhibited from responding to a TERMINATION signal until the logic 1 RESET signal is terminated as will be explained hereinbelow.

The power supply section also includes a clock generator for producing two phase clock pulses to the encoding and transmitting sections of the apparatus. The clock generator also provides for incorporating a predetermined delay after the termination of the input pulse before the latching circuit 34-35 is switched by a DELAY signal terminating the RESET signal and enabling latching circuit 23-24 to respond to a TERMINATION signal. The clock generator employs an oscillator 30 which produces squarewave pulses at a frequency of 45.4 KHz. The output (N18) of the oscillator 30 is applied through an inverter 46 to a circuit arrangement which produces two sets of clock pulses PH1 (N27) and PH2 (N28) which alternate in phase.

The oscillator 30 is set to a predetermined non-oscillating state (N18) by a logic 1 ENABLE signal (N8) from a latching circuit of a NOR gate 27 and an inverter 28 when the operating potential VDD is applied to the oscillator. The output of the oscillator 30 inverted by an inverter 46 (N19) and the ENABLE signal are applied to a latching circuit of NOR gates 31 and 32. The output (N11) of latching circuit 31-32 is inverted by the inverter 33 to provide an input (N12) to latching circuit 34-35.

Upon termination of the input signal at input terminal 13 or 14 which are connected to NOR gate 27 by means of a NOR gate 26, latching circuit 27-28 changes state and the ENABLE signal (N8) becomes a logic 0. This signal releases the oscillator 30 from its initial state allowing it to produce square wave pulses (N18). On a pulse from the oscillator 30 through inverter 46 (N19), latching circuit 31-32 switches operating states producing an input (N10) to NAND gate 49 of the clock generator circuitry enabling it to function in conjunction with the squarewave pulses from the oscillator 30 to produce the two phase clock pulses PH1 and PH2.

The output (N10) of the latching circuit 31-32 through the inverter 33 (N12) is also applied to a latching circuit of NOR gates 41 and 42. The output (N16) of NOR gate 42 is applied as a set signal to a two-stage shift register 40. The shift register is clocked by the two phase clock pulses PH1 and PH2 and its data input is grounded. The output (N31) of the shift register 40 and of the latching circuit 41-42 (N16) are applied to NOR gate 43. Prior to generation of the clock pulses PH1 and PH2 the signals applied to the NOR gate 43 cause it to produce a logic 0 DELAY signal (N17) to the latching circuit 34-35. During this logic 0 DELAY signal the latching circuit 34–35 produces the logic 1 RESET signal which properly initializes the circuitry.

A NOR gate 55 connected to elements of the clock generator circuitry produces a pulse (N30) immediately following the first PH2 clock pulse (N29). This pulse is applied to latching circuit 41–42 causing it to change operating states and terminate the logic 1 set signal (N16) to the shift register 40. The clock pulses PH1 and PH2 shift logic 0 data through the shift register and on the leading edge of the second PH2 clock pulse subsequent to termination of the setting signal, the first logic 0 from the input is shifted to the output (N31). The level of the DELAY signal (N17) from the NOR gate 43 thus changes from logic 0 to logic 1 switching the operating state of the latching circuit 34–35 and terminating the RESET signal (N14).

With termination of the RESET signal, latching circuit 23–24 is no longer inhibited from responding to a logic 1 TERMINATION signal. (Operating potential was supplied to NOR gate 23 on the first PH1 clock pulse.) When a logic 1 TERMINATION signal is received by the latching circuit 23–24, it changes operating states and causes MOS transistor Q3 to become nonconducting. Base current is no longer supplied to the switching transistor Q1 and it becomes nonconducting disconnecting the VDD terminal 12 from the negative terminal of the battery 10. Thus, operating potential is removed from all elements in the power supply section and other sections of the apparatus which are connected to the VDD terminal 12, and the entire apparatus reverts to the standby condition.

The manner in which the various elements of the power supply section of FIG. 2 cooperate during a complete cycle from standby to powering-up to return to standby may best be understood in conjunction with the timing diagrams of FIG. 3. As previously mentioned, during standby only those elements labeled with an "S" receive operating potential by being connected to the S terminal 11. All transistors associated with the S terminal are in a high impedance state drawing negligible power.

On a negative-going pulse, logic 1, at one of the input terminals 13 or 14, for example terminal 13, its corresponding MOS transistor Q2 becomes conductive providing a low impedance path between the base of switching transistor T1 and ground. Transistor T1 receives base current and switches from the nonconducting to the conducting condition changing the potential at the VDD terminal 12 from essentially ground to essentially the −9 volts potential of the battery 10. Operating potential is thus supplied to all the elements of the power supply section labeled "VDD" or "S" and to the elements of the encoding and transmitting sections of the apparatus.

The input signal is applied to NOR gate 21 changing its output (N3) which causes inverter 22 to produce a logic 1 (N3A) at the gate of MOS transistor Q3. MOS transistor Q3 thus provides a low impedance path between the base of switching transistor T1 and ground. The logic 0 output (N3) of NOR gate 21 together with enabling logic levels provided by other logic elements as the VDD operating voltage is applied to them causes latching circuit 34—35 to operate in a state which produces a logic 1 RESET signal (N14). This signal is applied to the latching circuit 23–24 causing it to change operating states. The output (N5) of the latching circuit 23–24 is applied by way of inverter 25, NOR gate 21, and inverter 22 to provide a logic 1 input (N3A) to MOS transistor Q3. Thus, the VDD voltage is latched and is maintained after termination of the input signal when the input (N1) to the gate of MOS transistor Q2 becomes a logic 0. The logic 1 RESET signal (N14) is applied to various elements of the encoding and transmitting sections of the apparatus to initialize them for an operating cycle.

Upon termination of the input signal at terminal 13, latching circuit 27–28 changes state to produce a logic 0 ENABLE signal (N8). This signal releases the oscillator 30 to produce squarewave output pulses (N18) and also enables latching circuit 31–32 which changes operating states on the first output pulse from the oscillator 30. The logic 1 output (N10) of the latching circuit 31–32 is applied to NAND gate 49 permitting proper operation of the clock generating circuitry to produce two phase clock pulses PH1 (N27) and PH2 (N29). The inverted output (N12) of latching circuit 31–32 provides enabling signals to latching circuit 34–35 and latching circuit 41–42.

The logic 1 output (N16) from the latching circuit 41–42, which is produced upon initial activation, is a set signal to the shift register 40 holding the contents of the shift register stages to logic 1's. This signal also causes the DELAY signal (N17) from the NOR gate 43 to be at logic 0. Immediately after the first PH2 clock pulse (N29) the NOR gate 55 produces a logic 1 pulse (N30) which causes latching circuit 41–42 to change state thus terminating the set signal (N16) to the shift register 40. The logic 0 input data is loaded into the shift register and shifted on the succeeding PH1 and PH2 clock pulses. On the second PH2 clock pulse subsequent to termination of the set signal (N16) the output (N31) of the shift register 40 becomes logic 0. This signal causes the DELAY signal (N17) from NOR gate 43 to change to logic 1. This change in the DELAY signal causes latching circuit 34–35 to change operating state terminating the logic 1 RESET signal (N14). With the RESET signal terminated and two clock pulses having been received, the encoding and transmitting sections of the apparatus are able to respond to the clock pulses PH1 and PH2 to transmit the appropriate message as will be explained hereinbelow. The logic 0 RESET signal to latching signal 23–24 enables that circuit to respond to a logic 1 TERMINATION signal. The delay instituted by counting the clock pulses produces a predetermined time delay after termination of the input signal sufficient to insure that the apparatus is properly powered-up and that the TERMINATION signal is at a logic 0 prior to transmission of the message.

With the encoding and transmitting sections of the apparatus receiving VDD operating potential and PH1 and PH2 clock pulses, they operate to transmit an appropriately encoded message as will be explained hereinbelow. Upon completion of the transmission cycle, a logic 1 TERMINATION signal is applied to latching circuit 23–24. This signal changes the operating state of latching circuit 23–24 causing the signal (N3A) to the gate of MOS transistor Q3 to change to logic 0. The MOS transistor Q3 becomes a high impedance and base current is no longer provided to the switching transistor T1 changing that transistor to the nonconducting condition. The negative terminal of the battery 10 is thus disconnected from the VDD terminal and operating potential is no longer provided to those elements connected to the VDD terminal 12. Thus, all elements in the apparatus revert to the standby condition.

Figure 4:
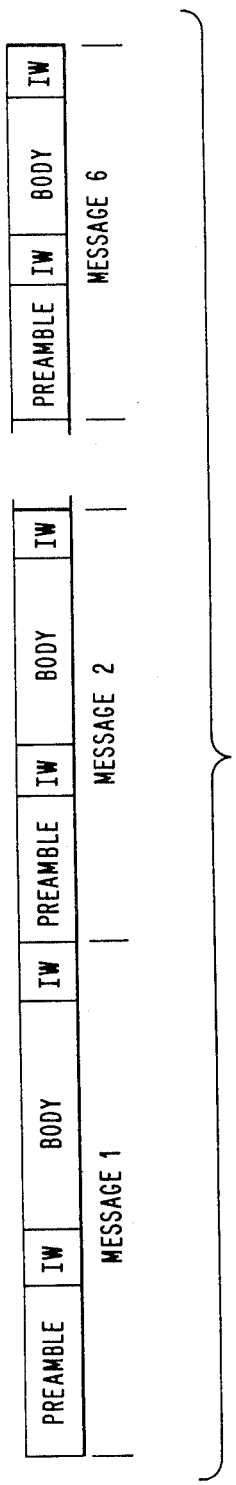
FIG. 4 is a diagram of the format of a transmission produced by the encoder and transmitter of FIG. 1.
Figure 5:
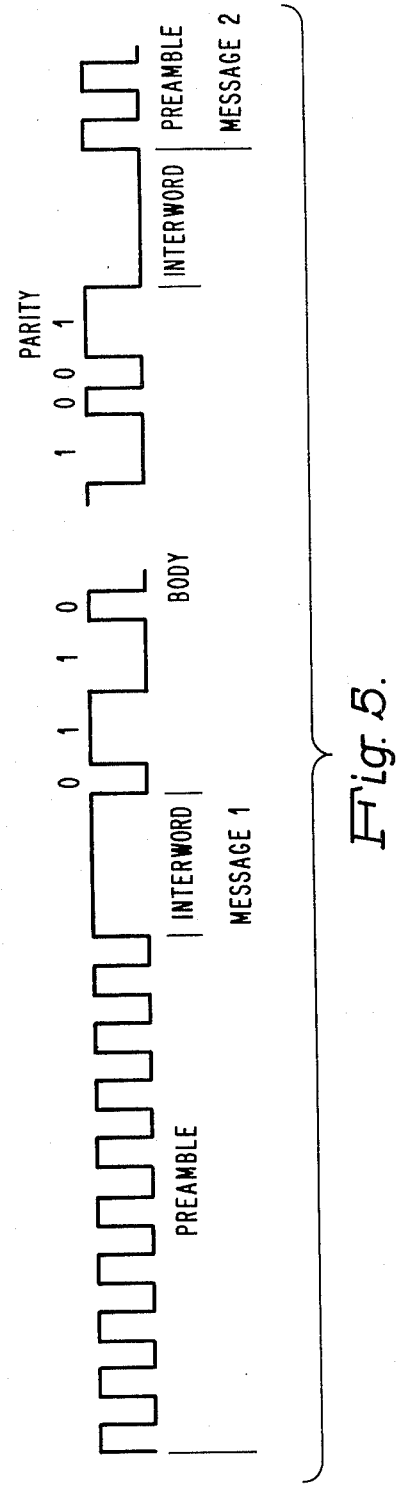
FIG. 5 is a portion of the pulse train of a sample message produced by the encoder and transmitter of FIG. 1.

The operation of the encoding and transmitting sections of the apparatus which is illustrated in the block diagram of FIG. 1 is best understood with reference to the diagrams of FIGS. 4 and 5. As stated previously, in response to receiving operating power and clock pulses from the power supply and clock generator section 1 the encoding and transmitting sections of the apparatus transmit one of two predetermined messages. The particular message is determined by which input terminal 13 or 14 receives the input signal. The message is transmitted as a continuous wave RF signal at 350 MHz which is digitally encoded by an NRZ (non-return to zero) code. With the NRZ code logic 0's and logic 1's are not represented by a voltage level but by the duration or period between voltage transitions. With this code as employed in the specific embodiment under discussion a logic 0, or short bit, is a pulse 1.85 milliseconds in duration and a logic 1, or long bit, is a pulse 5.55 milliseconds in duration, three times the logic 0 bit. The RF signal is 100% amplitude modulated by the NRZ digital pulses.

The format of a complete transmission cycle as illustrated in FIG. 4 includes a preamble, an interword, the body of the message, and a second interword. This sequence is repeated five times for a total of six messages, and then the apparatus turns off to revert to the standby state. The body of the message is a 16 bit word, fourteen of which identify the source of the transmission. The word also contains an activity bit which indicates whether the input signal occurs on terminal 13 or terminal 14. A 16th bit is a parity bit.

A portion of a sample message is illustrated in the voltage level diagram of FIG. 5. The first portion of the message is a preamble of 18 logic 0's as represented by voltage transitions every 1.85 milliseconds. The preamble is followed by an interword period which is equal to the duration of six logic 0's (11.1 milliseconds). The body of the message consisting of the 16 bit word then follows, a spacing between transitions of 1.85 milliseconds representing a logic 0 and a spacing between transitions of 5.55 milliseconds representing a logic 1. A second interword having the same duration as six logic 0's (11.1 milliseconds) follows the body. The message is repeated five times so that a complete transmission is six messages.

The apparatus of FIG. 1 operates in the following manner to produce the transmitted signal. The power supply and clock generator section 1 provides the VDD operating potential, the RESET signal, and the PH1 and PH2 two phase clock pulses to all the elements of the apparatus as needed. Identification data 60 which uniquely identifies the particular unit of apparatus which is the source of the transmission is an arrangement of 14 open connections and shorts to ground to represent logic 1's and 0's. A 15th bit for the body of the message is provided by a flip-flop 61 which is set in one state or theother depending upon whether the input signal appears on input terminal 13 or 14.

The "0" period generator 62, which is a divide-by-42 divider, produces output pulses of 1.85 milliseconds duration, the basic short bit or logic 0 pulse period. The output of the "0" period generator 62 is applied to a preamble counter 64 which passes the pulses through to output circuitry 65. From the output circuitry the pulses are applied to a modulator 75 where they 100% modulate the 350 MHz output of an RF oscillator 76. The higher voltage level causes the modulator to pass the 350 MHz carrier signal and the lower voltage level causes the modulator to block the carrier signal. The resulting continuous wave RF signal is transmitted by an antenna 77. During the preamble period the identification data 60 and contents of the flip-flop 61 are loaded into data register circuitry 70.

When the preamble counter 64 has passed the 18 logic 0's of a preamble, it signals sequence logic circuitry 63 which then enables the interword counter 66. The interword counter 66 also receives pulses from the "0" period generator 62 and produces a steady output for a period of six logic 0's (11.1 milliseconds) as shown in the diagram of FIG. 5. This output is applied to the output circuitry 65 and then to the modulator 75.

After the interword counter 66 signals the end of the interword, the sequence logic circuitry 63 causes the data register circuitry 70 to read out the 15 bits of data stored therein to the output circuitry 65. The data stored in the shift register circuitry as logic 0's and 1's determines whether an output voltage transition occurs after one or three 1.85 millisecond pulses from the "0" period generator 62. The data register circuitry 70 includes a parity generator for adding an appropriate 16th parity bit to provide odd parity.

The word counter 71 counts the transitions as the 16 bit word of the body of the message is being transmitted. Upon detecting the end of the word, the word counter 71 produces an indication to a message counter 72 which stores a count. Signals to the sequence logic circuitry 63 and the interword counter 66 cause the interword counter to generate a second interword equal to six logic 0's (11.1 milliseconds).

After the second interword has been produced, the sequence logic circuitry 63 causes the process to be repeated and another message of preamble, first interword, body, and second interword identical to the first message is transmitted. At the end of the body of each message a count is added to the count stored in the message counter 72. When the message counter receives the sixth count indicating that the body of the sixth message has been transmitted, it produces a logic 1 TERMINATION signal to the power supply and clock generator 1. As explained in detail hereinabove this signal causes the power supply and clock generator 1 to power down terminating the VDD operating potential and also the clock signals to the encoding and transmitting sections of the apparatus thereby preventing any further RF transmission until another input signal is received.

While there has been shown and described what is considered to be a preferred embodiment of the present invention, it will be obvious to those skilled in the art that various changes and modifications may be made therein without departing from the invention as defined by the appended claims.

What is claimed is:

1. Electrical power supply apparatus comprising
a source of electrical potential;
a power output terminal;
switch means connected between the source of electrical potential and the power output terminal and operable when an activating signal is applied thereto to connect the source of electrical potential to the power output terminal;
input means coupled to the switch means for applying an activating signal to the switch means in response to an input signal;
latching means coupled to the input means and to the switch means for producing an activating signal to the switch means in response to the input signal and for maintaining the activating signal to the switch means subsequent to termination of the input signal;

said latching means being operable to terminate the activating signal to the switch means in response to a termination signal applied thereto;

delay means coupled to said latching means for preventing a termination signal from terminating the activating signal for a predetermined period; wherein said latching means has a first operating state during which an activating signal is not produced and a second operating state during which an activating signal is produced; said latching means being operable to be switched from the first operating state to the second operating state in response to an input signal at said input means, and being operable to be switched from the second operating state to the first operating state in response to a termination signal applied thereto;

and including control means coupled to the delay means and to the latching means for inhibiting the latching means from being switched from the second operating state to the first operating state prior to termination of said predetermined period;

and wherein said control means has a first operating state and has a second operating state during which a control signal is produced; said control means being caused to operate in the second operating state in response to an activating signal being produced by said latching means, and being operable to be switched from the second operating state to the first operating state in response to termination of said predetermined period; and said latching means is inhibited from switching from said second operating state to said first operating state during the occurrence of said control signal.

2. Electrical power supply apparatus in accordance with claim 1 including enabling means coupled to said input means and to said delay means for initiating said predetermined period upon termination of the input signal.

3. Electrical power supply apparatus in accordance with claim 2 including a semiconductor switching device having a first electrode connected to the source of electrical potential, a second electrode connected to the power output terminal, and a third electrode;

an input signal terminal;

first input switching means connected to the third electrode of the semiconductor switching device, to a source of reference potential, and to the input signal terminal; said first input switching means being operable to provide a low impedance path between the source of reference potential and the third electrode during the presence of an input signal at the input signal terminal, and being operable to provide a high impedance path between the source of reference potential and the third electrode during the absence of an input signal at the input signal terminal; and second input switching means connected to the third electrode of the semiconductor switching device, to the source of reference potential, and to the latching means; said second input switching means being operable to provide a low impedance path between the source of reference potential and the third electrode while the latching means is in said second operating state and being operable to provide a high impedance path between the source of reference potential and the third electrode while the latching means is in said first operating state;

said semiconductor switching device being biased in a low conduction condition when a high impedance path is provided between the third electrode and the source of reference potential, and being biased in a high conduction condition thereby connecting the source of electrical potential to the power output terminal when a low impedance path is provided between the third electrode and the source of reference potential.

4. Electrical power supply apparatus in accordance with claim 3 including oscillator means for producing output pulses at a predetermined frequency;

counting means coupled to the oscillator means for producing a delay signal in response to a predetermined number of output pulses from the oscillator means;

said control means being coupled to the counting means and being switched from the second operating state to the first operating state thereby terminating said control signal in response to a delay signal from the counting means.

5. Electrical power supply apparatus in accordance with claim 4 wherein said enabling means is coupled to said input signal terminal and to said oscillator means and is operable to produce an enabling signal upon termination of the input signal at the input signal terminal; and said oscillator means is operable to produce output pulses during the presence of the enabling signal from said enabling means.

6. Electrical power supply apparatus in accordance with claim 5 wherein said oscillator means is connected to said power output terminal to obtain operating potential.

7. Electrical power supply apparatus in accordance with claim 6 including a standby power output terminal coupled to said source of electrical potential for providing a standby potential source when an activating signal is not being applied to said switch means;

said latching means being coupled to said standby power output terminal to obtain operating potential, whereby the latching means is enabled to operate in response to an input signal.

* * * * *